(12) United States Patent
Paul

(10) Patent No.: US 12,338,146 B2
(45) Date of Patent: *Jun. 24, 2025

(54) WASTEWATER TREATMENT SYSTEM AND METHOD FOR PRODUCING SLUDGE FOR CEMENT MANUFACTURING

(71) Applicant: Alden Group Environmental Solutions, LLC, The Woodlands, TX (US)

(72) Inventor: William Paul, Bucyrus, KS (US)

(73) Assignee: Alden Group Environmental Solutions, LLC, The Woodlands, TX (US)

( * ) Notice: Subject to any disclaimer, the term of this patent is extended or adjusted under 35 U.S.C. 154(b) by 1104 days.

This patent is subject to a terminal disclaimer.

(21) Appl. No.: 16/944,673

(22) Filed: Jul. 31, 2020

(65) Prior Publication Data

US 2021/0032132 A1 Feb. 4, 2021

Related U.S. Application Data

(60) Provisional application No. 62/880,823, filed on Jul. 31, 2019.

(51) Int. Cl.
*C02F 1/52* (2023.01)
*C02F 1/66* (2023.01)
(Continued)

(52) U.S. Cl.
CPC .................. *C02F 1/52* (2013.01); *C02F 1/66* (2013.01); *C02F 11/145* (2019.01); *C04B 7/4423* (2013.01); *C02F 2101/203* (2013.01)

(58) Field of Classification Search
CPC .. C02F 1/52; C02F 11/145; C02F 1/66; C02F 2101/203; C04B 7/4423
(Continued)

(56) References Cited

FOREIGN PATENT DOCUMENTS

| JP | H0929293 A | * | 2/1997 |
| JP | H105800 A | * | 1/1998 |

OTHER PUBLICATIONS

Machine Translation of JP H105800 A. (Year: 1998).*
(Continued)

*Primary Examiner* — Coris Fung
*Assistant Examiner* — Catriona M Corallo
(74) *Attorney, Agent, or Firm* — Hovey Williams LLP; Paul J. Walker

(57) ABSTRACT

A wastewater treatment system, including a wastewater phase-separation device, may be used to combine at least one primary treatment chemical and wastewater to produce cleaned water and a sludge byproduct. The wastewater treatment system may also include a wastewater dewatering device that may be used to combine the sludge byproduct and at least one secondary treatment chemical to produce a Medium to High Solids Content Sludge without excess water. A method for producing sludge for cement manufacturing may include combining wastewater and at least one primary treatment chemical to form a liquid phase and a solid phase, where the liquid phase includes clean water and the solid phase includes a sludge byproduct, separating the liquid phase from the solid phase, combining the solid phase with at least one secondary treatment chemical to form an intermediate that contains excess water, and removing the excess water from the intermediate to form a Medium to High Solids Content Sludge.

15 Claims, 2 Drawing Sheets

(51) Int. Cl.
   *C02F 11/145*   (2019.01)
   *C04B 7/44*    (2006.01)
   *C02F 101/20*  (2006.01)

(58) Field of Classification Search
   USPC ........................................................ 106/745
   See application file for complete search history.

(56) References Cited

OTHER PUBLICATIONS

Saidur et al. "A review on kiln system modeling", Renewable and Sustainable Energy Reviews 15 (2011) 2487-2500. (Year: 2011).*
Wakeman, Richard J. "Separation technologies for sludge dewatering". Journal of Hazardous Materials 144 (2007) p. 614-619. (Year: 2007).*
Czechowski et al. "Sewage sludge stabilisation with calcium hydroxide: Effect on physicochemical properties and molecular composition". Water Research 40 (2006) p. 1895-1905. (Year: 2006).*
Machine Translation of JP H0929293 A. (Year: 1997).*
Bourliva et al. "Municipal wastewater treatment with bentonite from Milos Island, Greece". Bulletin of the Geological Society of Greece, 2010, p. 2532-2539. (Year: 2010).*
Britannica Online Encyclopedia, "Calcium Hydroxide". Sep. 23, 2023. (Year: 2023).*
Samara et al. "Use of clay minerals for sewage sludge stabilization and a preliminary assessment of the treated sludge's fertilization capacity". Environmental Science and Pollution Research, Apr. 24, 2019, 26:35387-35398. (Year: 2019).*

\* cited by examiner

WASTEWATER TREATMENT SYSTEM AND METHOD FOR PRODUCING SLUDGE FOR CEMENT MANUFACTURING

RELATED APPLICATION

This Application claims priority to U.S. Provisional Patent Application No. 62/880,823, entitled "Systems and Methods for Treating Wastewater for the Production of Sludge for Cement Manufacturing," filed Jul. 31, 2019, which is expressly incorporated by reference herein.

BACKGROUND

Wastewater treatment systems and technologies are well known, with many focusing on the treatment of wastewater for various forms of water reuse or water discharge. While conventional wastewater treatment plants convert wastewater to water suitable for discharge or reuse, such plants may produce a sludge byproduct. Sludge byproduct contains waste solids and contaminants, such as metals that must be removed for the water to be suitable for reuse or discharge. This process may use coagulation and flocculation to separate water from a wide range of contaminants, many in the form of waste solids. In many such conventional wastewater treatment facilities, the sludge byproduct may be directly disposed in landfills, such as via injection or slurry wells, may be used in land applications, or may be destroyed in incinerators, thermal desorption, or thermal dries.

SUMMARY OF THE INVENTION

A wastewater treatment system includes a wastewater phase-separation device that combines at least one primary treatment chemical and wastewater to produce cleaned water and a sludge byproduct and a wastewater dewatering device that combines the sludge byproduct and at least one secondary treatment chemical to produce a Medium to High Solids Content Sludge and remove excess water. A method for producing sludge includes combining wastewater and at least one primary treatment chemical to form a liquid phase and a solid phase, wherein the liquid phase is made up of clean water and the solid phase is made up of a sludge byproduct, separating the liquid phase from the solid phase, combining the solid phase with at least one secondary treatment chemical to form an intermediate, the intermediate containing excess water, and removing the excess water from the intermediate to form a Medium to High Solids Content Sludge.

DETAILED DESCRIPTION OF THE EMBODIMENTS

Embodiments of the disclosure provide a system and method for treating wastewater and conditioning wastewater sludge byproduct to produce a product that may be used in cement production.

Figure 1:
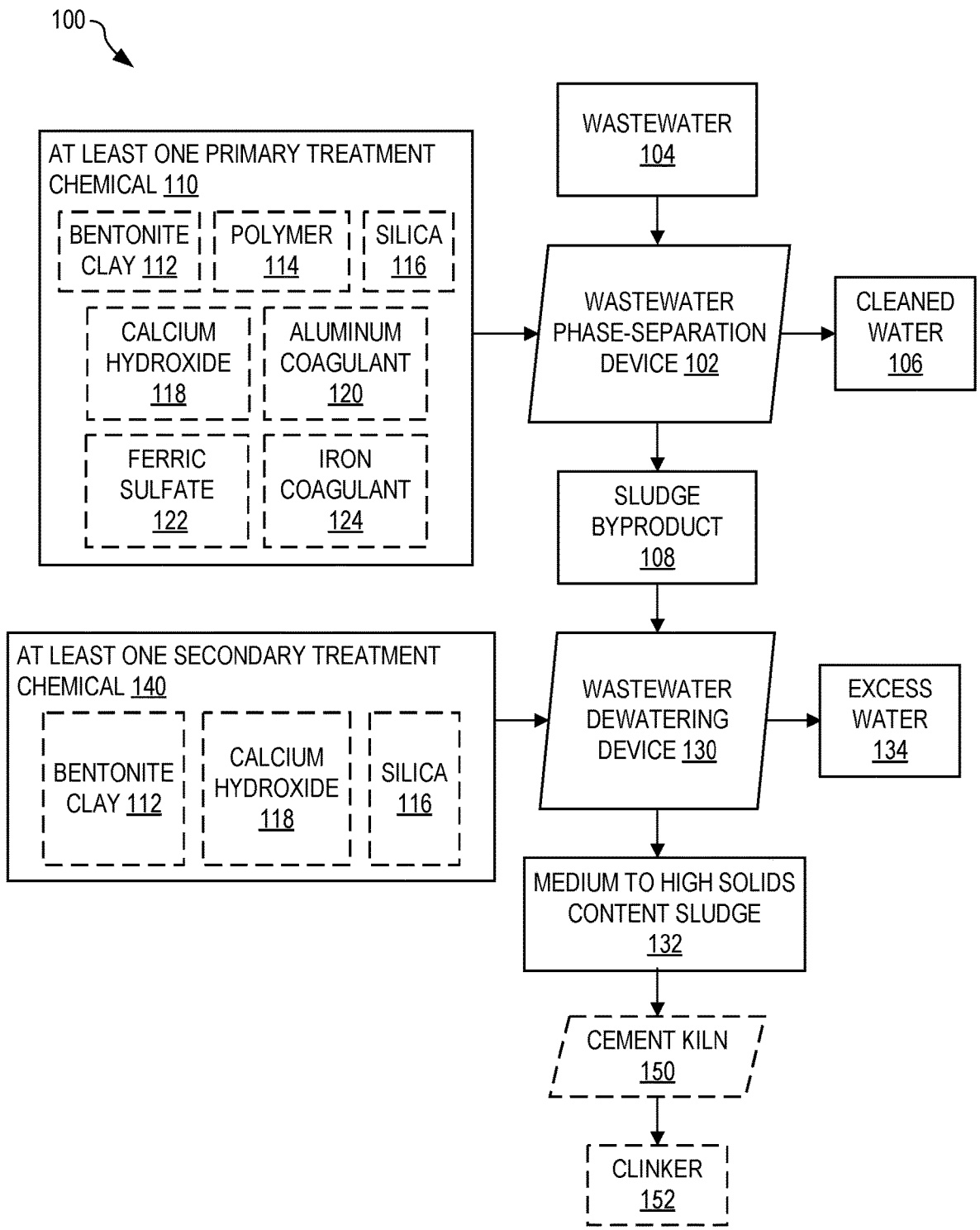
FIG. 1 illustrates one wastewater treatment system that includes a wastewater phase-separation device and a wastewater dewatering device that are used to form a Medium to High Solids Content Sludge.

FIG. 1 illustrates one wastewater treatment system 100 that includes wastewater phase-separation device 102 and a wastewater dewatering device 130 that are used to form Medium to High Solids Content Sludge 132. The wastewater treatment system 100 combines wastewater 104 with at least one primary treatment chemical 110 to form cleaned water 106 and a sludge byproduct 108. The wastewater dewatering device 130 combines the sludge byproduct 108 with at least one secondary treatment chemical 140 to form the Medium to High Solids Content Sludge 132 that lacks excess water 134 (e.g., from which excess water 134, as is further described herein, may be removed).

In an embodiment, the at least one primary treatment chemical 110 may include, or may be chosen from a group that includes, one or more of bentonite clay 112, polymer 114, silica 116, calcium hydroxide 118, aluminum coagulant 120, ferric sulfate 122, and iron coagulant 124. In an embodiment, the at least one secondary treatment chemical 140 may include, or may be chosen from a group that includes, one or more of bentonite clay 112, calcium hydroxide 118, and silica 116.

In some embodiments, the Medium to High Solids Content Sludge may be heated in a cement kiln 150 to form clinker 152, which may be used in cement manufacturing as described below.

In some embodiments, the wastewater treatment system 100 includes multiple stages, such as a pre-treatment stage, a solids separation stage performed in the wastewater phase-separation device 102, a solids concentration stage performed in the wastewater dewatering device 130, and a post-treatment stage. In some wastewater treatment systems, the pre-treatment stage includes processes to facilitate the solids to be removed and filtered more easily. The solids separation stage may involve the separation of two phases (solid and liquid) from a suspension. In the separation stage, the wastewater phase-separation device 102 may recover the solid component, including the Medium to High Solids Content Sludge 132, for use in manufacturing of construction materials (e.g., cement) while the liquid, cleaned water 106 is discarded or reused. The wastewater phase-separation device 102 may include one or more of a filter press, a vacuum drum, a belt press, a fan press, a band filter, a dewatering box centrifuge, a screw press, a batch tank reactor, an auto sequential batch unit, a continuous flow unit, a dissolved air flotation (DAF), an induced air floatation (IAF) round, a rectangle gravity clarifier, a thickener, and/or an angle plate lamella clarifier.

In the solids concentration stage, the wastewater dewatering device 130 may dewater the solid component (e.g., the sludge byproduct 108 obtained from the wastewater phase-separation device 102). In this stage, a portion (or all) of the remaining liquid, which may be referred to herein as excess water 134, may be removed, for example, via a device or process utilizing gravity, via mechanical thickening in which a liquid volume throughput load may be reduced, or another like process. The wastewater dewatering device 130 may be or include one or more of a filter press, a vacuum drum, a belt press, a fan press, a band filter, a dewatering box centrifuge, a screw press, a batch tank reactor, an auto sequential batch unit, a thickener, a continuous flow unit, a DAF, an IAF round, a rectangle gravity clarifier, and/or an angle plate lamella clarifier.

As is further described herein, the solids separation stage may involve changing the nature of the suspended solids by chemical means, such as by adding at least one primary treatment chemical 110 to the wastewater phase-separation device 102. In various implementations, the chemical means used in the solids separation stage may include one or more of bentonite clay 112, polymer 114, silica 116, calcium hydroxide 118, aluminum coagulant 120, ferric sulfate 122, and/or iron coagulant 124. Likewise, the solid concentration stage may involve changing the nature of the sludge byproduct 108 by chemical means, such as by adding at least one secondary treatment chemical 140 to the wastewater dewatering device 130. In various implementations, the chemical means used in the solid concentration stage may include one or more of bentonite clay 112, calcium hydroxide 118, and silica 116. The added materials may act as one or more bulking agents to increase the permeability of a cake formed during subsequent filtration or dewatering. Generally, wastewater 104 is evaluated based on the content, concentration, volume, molar ratio, weight percentage, and other like measures of one or more substances in the wastewater (e.g., iron, aluminum, silica, and/or calcium). The levels of these substances in the wastewater 104 is related to the levels of inorganic constituents retained in the resultant Medium to High Solids Content Sludge byproduct 132, and thus the levels of inorganic constituents in Medium to High Solids Content Sludge 132 may vary in accordance with different types of wastewater 104. In some cases, the wastewater 104 may contain less than 5 total weight percent (wt %) of these inorganic solids, which may then be removed through phase separation using the wastewater phase-separation device 102. Profile analysis of a raw wastewater stream, from which wastewater 104 may be taken, may indicate which of multiple inorganic constituents is, for example, of a highest level in the sampled wastewater 104. Optionally, wastewater treatment system 100 may be optimized to target the inorganic constituent having the highest level (or, e.g., having a level that exceeds a corresponding threshold). Such a process to target inorganic constituents may facilitate successful solids treatment of the waste from the wastewater using high-performance phase separation. Once the resultant sludge byproduct 108 is separated and dewatered to form Medium to High Solids Content Sludge 132, it may contain up to 50 wt % of the targeted inorganic constituent.

In an embodiment, Medium to High Solids Content Sludge 132 from the wastewater dewatering device 130 may be heated at high temperatures in a cement kiln 150 to produce grayish-black pellets, such as clinker 152, which may be suitable for producing cement.

In the wastewater phase-separation device 102, the wastewater 104 is mixed with effective amounts of at least one primary treatment chemical 110 to reach a particular pH at which the wastewater 104 achieves solid-liquid separation. The choice of at least one primary treatment chemical 110 may be based on a profile of the wastewater 104 (e.g., the constituents of the wastewater 104 and/or other metrics). In some embodiments, treatment of the wastewater 104 may include the use of bentonite clay 112, polymer 114, silica 116, calcium hydroxide 118, aluminum coagulant 120, ferric sulfate 122, and/or iron coagulant 124 to condition the wastewater 104 such that the cleaned water 106 and sludge byproduct 108 each has one or more desired characteristics, for example, indicating a successful treatment. In some embodiments, treatment of the wastewater 104 may include the use of only a single one of bentonite clay 112, polymer 114, silica 116, calcium hydroxide 118, aluminum coagulant 120, ferric sulfate 122, or iron coagulant 124. In some embodiments, the wastewater 104 may require the use of a combination of bentonite clay 112, polymer 114, silica 116, calcium hydroxide 118, aluminum coagulant 120, ferric sulfate 122, and iron coagulant 124. In some embodiments, the effective amount of each of the at least one primary treatment chemical 110 utilized for treatment is based on the profile of the wastewater 104. In some embodiments, from about 1 to about 25 wt % (e.g., based on the weight of the solids in the wastewater 104) of each of the primary treatment chemicals 110 may be selected for wastewater treatment based on the profile of the wastewater 104. In some embodiments, the effective amount of each of the at least one primary treatment chemical 110 may be from about 1 to about 15 wt %, or from about 1 to about 10 wt %, or from about 1 to about 5 wt % of the total weight of the solids in the wastewater 104. In some embodiments, about 1 to about 15 wt % of a first of the at least one primary treatment chemical 110 is added to the wastewater stream, while about 1 to about 5 wt % of another at least one primary treatment chemical 110 is added to the wastewater 104. Other amounts of the at least one primary treatment chemical 140 may be used without departing from the scope hereof.

After the phase separation occurs in the wastewater phase-separation device 102, the cleaned water 106 may be suitable for discharge or reuse. In such cases, the separated sludge byproduct 108 may then be conveyed, containerized, and transported to the wastewater dewatering device 130. In the wastewater dewatering device 130, the sludge byproduct 108 is mixed with at least one secondary treatment chemical 140. The choice of at least one secondary treatment chemical 140 is based on the profile of the sludge byproduct 108. In some embodiments, further treatment of the sludge byproduct 108 may include the use of bentonite clay 112, calcium hydroxide 118, and/or silica 116 to condition the Medium to High Solids Content Sludge 132 to have the desired characteristics for use in the production of construction materials. In some embodiments, further treatment of the sludge byproduct 108 may include the use of only one of bentonite clay 112, calcium hydroxide 118, or silica 116. In some embodiments, further treatment may include the use of a combination of bentonite clay 112, calcium hydroxide 118, and/or silica 116. The effective amount of each of the at least one secondary treatment chemical 140 utilized for further treatment of the sludge byproduct 108 is based on the profile of the sludge byproduct 108. In embodiments, about 1 to about 25 wt % (e.g., based on the weight of the solids in the sludge byproduct 108) of each of the secondary treatment chemicals 140 is selected for further treatment based on the profile of the sludge byproduct 108. In some embodiments, the effective amount of each at least one secondary treatment chemical 140 may be about 1 to about 15 wt %, or about 1 to about 10 wt %, or about 1 to about 5 wt % of the total weight of the solids in the sludge byproduct 108. In some embodiments, about 1 to about 15 wt % of a first of the at least one secondary treatment chemical 140 is added to the sludge byproduct 108, while about 1 to about 5 wt % of a second of the at least one secondary treatment chemical 140 is added to the sludge byproduct 108. Other amounts of the at least one secondary treatment chemical 140 may be used without departing from the scope hereof.

The pH value of the wastewater 104 may be adjusted for more a relatively more precise contaminate removal process via the wastewater phase-separation device 102 prior to or during the procedures described herein. The pH value of the sludge byproduct 108 may be adjusted for relatively more precise contaminate removal via the wastewater dewatering device 130 prior to or during the procedures described herein. The pH value corresponds to the acidity or alkalinity of a solution on a logarithmic scale on which 7 is neutral, lower values represent fluids being more acidic, and higher values represent fluids being more alkaline. The pH is equal to $-\log_{10} C$, where C is the hydrogen ion concentration in moles per liter. pH adjustment compounds and minerals may be or include at least one of aluminum chlorohydrate, aluminum chloride, aluminum sulfate, calcium hydroxide, lime, ferrous chloride, ferrous sulfate, ferric chloride, and/or ferric sulfate. One or more of the pH adjustment compounds may be added in amounts effective to adjust the pH of the wastewater 104 as desired to generate clean water 106.

According to embodiments described herein, coagulation may include the addition of at least one primary treatment chemical 110 to the wastewater 104 that clumps the small and destabilized particles within wastewater 104 together to form larger aggregates, which may be more easily separated in the wastewater phase-separator 102. Coagulation and flocculation may also be processes used with the wastewater treatment techniques described herein. Coagulation destabilizes particles through chemical reactions between the coagulant and colloids, and flocculation transports the destabilized particles that will cause collisions with floc. Coagulation is a process that relies on neutralization of charge. Flocculation, on the other hand, is a physical process in which colloids come out of suspension in the form of floc, either spontaneously or due to the addition of a clarifying polymer agent. These polymer agents may have both anionic and cationic charge characteristics. The flocculation action differs from precipitation in that, prior to flocculation, colloids are merely suspended in a liquid and not actually dissolved in a solution. In the flocculated system, there is no formation of a cake, since all the flocs are in the suspension.

Coagulation involves using one or more compounds, including but not limited to aluminum chlorohydrate, aluminum chloride, aluminum sulfate, calcium hydroxide, lime, ferrous chloride, ferrous sulfate, ferric chloride, and/or a ferric sulfate and bentonite clay (potassium, sodium, calcium, and aluminum) composition. The combined coagulation and flocculation process may be used as a preliminary step or an intermediary step performed by at least one of the wastewater phase-separation device 102 and the wastewater dewatering device 130.

In embodiments, a process for treating wastewater 104 may include using chemicals to produce a desired condition of the Medium to High Solids Content Sludge 132 so that it may be suitable for manufacturing cement products due to its mineral contents. Exemplary cement products may include one or more of Portland cement, pozzolana cement, rapid hardening cement, quick setting cement, low heat cement, sulphate resisting cement, blast furnace slag cement, high alumina cement, white cement, colored cement, air entraining cement, expansive cement, hydrographic cement, hydrophobic cement, super sulfate cement, low alkali cement, polymer cement, calcium sulfoaluminate cement, and natural cement. Other cement products may be generated without departing from the herein.

In various embodiments, the techniques described herein provide a process of wastewater treatment and sludge disposal that utilizes the Medium to High Solids Content Sludge 132 to manufacture Portland cement. Portland cement gets its strength from a hydration process where some complex chemical reactions take place between cement and water. Portland cement may be manufactured according to the following steps. Firstly, lime or calcium, silica, alumina, iron, and/or other minerals or compounds are crushed, milled, and proportionated. These materials, without gypsum, are proportioned to produce a mixture with a desired chemical composition. These substances are ground and blended in either a dry process or a wet process. Afterwards, the materials are fed through a kiln at about 2,600° F. to produce clinker. During this step, the alumina and iron may act as fluxing agents and may lower the melting point of the silica from 3,000° F. to 2,600° F. The clinker is then cooled and pulverized, and gypsum is added to regulate setting time. Lastly, the clinker is ground extremely fine to produce cement. This process may be used with clinker 152 generated using wastewater treatment system 100.

Figure 2:
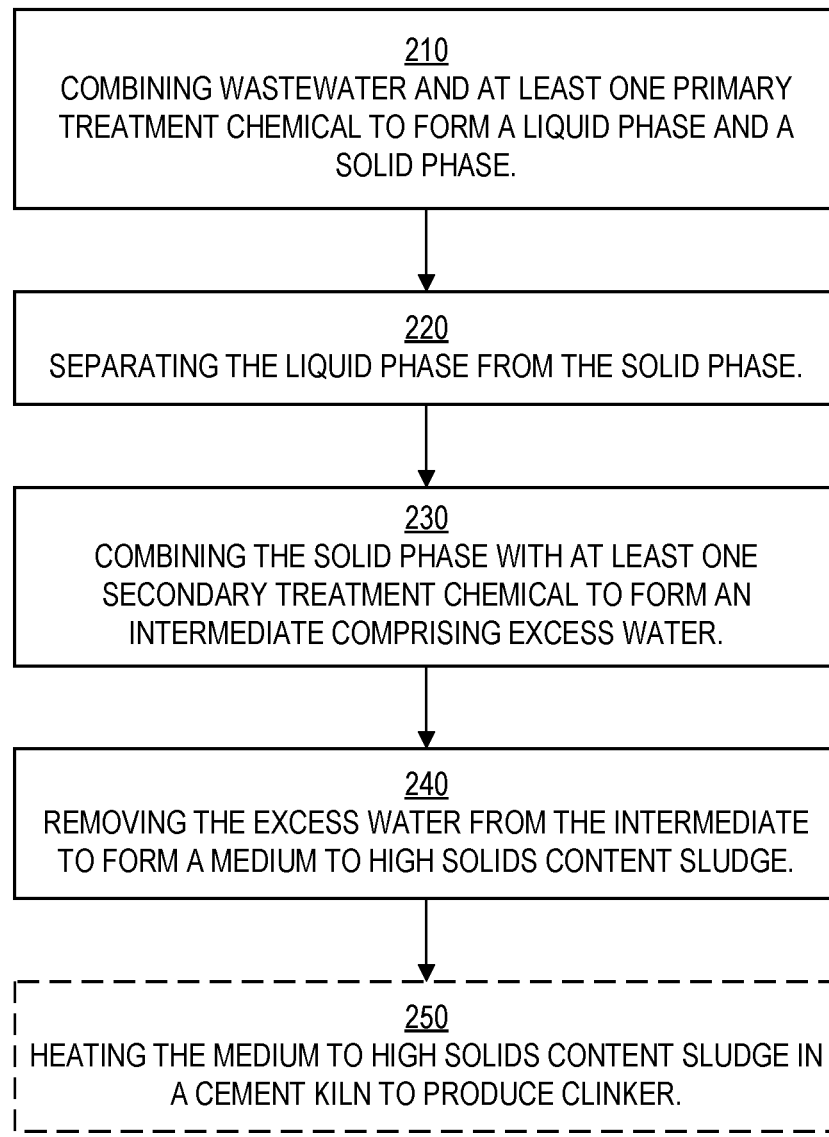
FIG. 2 is a flowchart illustrating an exemplary method for producing sludge for cement manufacturing using Medium to High Solids Content Sludge generated from a wastewater treatment system of FIG. 1.

FIG. 2 is a flowchart illustrating an exemplary method 200 for producing sludge for cement manufacturing using Medium to High Solids Content Sludge generated from wastewater treatment. Method 200 may be used in conjunction with wastewater treatment system 100.

In block 210, wastewater is combined with at least one primary treatment chemical so that a liquid phase and a solid phase are formed. In one example of block 210, wastewater 104 is combined with at least one primary treatment chemical 110 in wastewater phase-separation device 102 to form a liquid phase, cleaned water 106, and a solid phase, sludge byproduct 108.

In block 220, the liquid phase is separated from the solid phase. In one example of block 220, clean water 106 is separated from sludge byproduct 108 by wastewater phase-separation device 102.

In block 230, the solid phase is combined with at least one secondary treatment chemical to form an intermediate that contains excess water. In one example of block 230, sludge byproduct 108 is combined with at least one secondary treatment chemical 140 in the wastewater dewatering device 130 to form an intermediate that contains excess water 134.

In block 240, the excess water is removed from the intermediate to form a Medium to High Solids Content Sludge. In one example of block 240, the excess water 134 is removed from the intermediate in the wastewater dewatering device 130 to form the Medium to High Solids Content Sludge 132.

In certain embodiments, the method 200 includes one or more additional blocks of the flowchart in FIG. 2. In block 250, the Medium to High Solids Content Sludge is heated in a cement kiln to form clinker. In one example of block 250, the Medium to High Solids Content Sludge 132 is heated in cement kiln 150 to form clinker 152.

In some embodiments, the at least one primary treatment chemical of block 210 may be or include one or more of bentonite clay, polymer, silica, calcium hydroxide, aluminum coagulant, ferric sulfate, and iron coagulant.

In certain embodiments, the at least one secondary treatment chemical of block 230 may be or include one or more of bentonite clay, calcium hydroxide, and silica.

Since the method 200 may be used in the wastewater treatment system 100 described previously, the description of respective components of the wastewater treatment system 100 discussed above with respect to FIG. 1 applies to those elements of method 200 with like names. Furthermore, method 200 is not limited, unless otherwise specified or understood by those of ordinary skill in the art, to the order shown in FIG. 2.

EXAMPLES

In a first example, wastewater 104 is derived from a generator wastewater stream, which is sampled and tested to determine levels of primary inorganic constituents including at least one of calcium, iron, aluminum, and silica to determine effective amounts of at least one primary treatment chemical 110 and at least one secondary treatment chemical 140. The analytical profile of the inorganic constituents in the wastewater 104 provides a basis of the flocculant blend (the at least one primary treatment chemical 110 added) to be used. Optionally, chemicals may be added for pH adjustment of the wastewater 104.

In a second example, wastewater 104 is derived from a flexographic ink wastewater stream, which is determined to include iron, aluminum, silica, and calcium. Based on different types of flexographic ink wastewater streams, at least one of aluminum and iron may be present in the highest levels and at least one of silica and calcium is present at lower concentration.

A flexographic wastewater stream may contain less than 2 percent inorganic solids to be removed through phase separation, e.g., in wastewater phase-separation device 102. Levels of these inorganic constituent (aluminum, iron, silica, and calcium) in the wastewater stream are related to the levels of inorganic constituents retained in the sludge byproduct generated in waste treatment system 100. After phase separation in wastewater phase-separation device 102, the sludge byproduct 108 may include about 10 wt % aluminum, about 6 to about 8 wt % iron and about 2 to about 3 wt % calcium, and about 1 to about 2 wt % silica.

Accordingly, a bentonite clay formula may be used in wastewater treatment system 100 when processing flexographic ink wastewater. This formula is optimized to target the inorganic constituents present with largest concentration to allow efficient phase-separation. Once the resultant sludge byproduct is dewatered in the wastewater dewatering device 130, the resultant Medium to High Solids Content Sludge 132 may contain up to about 50 weight percent aluminum.

In another example, wastewater 104 is derived from a metal stamping fine blanking wastewater stream that includes at least one of iron, aluminum, silica, and calcium. The facility that generates the metal stamping fine blanking wastewater stream dictates what contaminants will be present in the wastewater 104. For example, facilities process ferrous alloy metals may generate wastewater streams that contain relatively large concentrations of iron, while facilities that process aluminum alloy metals may generate wastewater streams that contain relatively large concentrations of aluminum.

A metal stamping fine blanking wastewater stream may contain less than 2 percent inorganic solids capable of removal through phase separation. The level of constituent (aluminum, iron, silica, and calcium) in the wastewater 104 is related to the levels of inorganic constituents retained in the resultant Medium to High Solids Content Sludge 132 generated with wastewater treatment system 100. It has been determined through analytical profiling that contaminants are frequently found in the following descending wt % order: at least one of aluminum and iron followed by calcium and silica.

The amounts of the at least one primary treatment chemical 110 and the at least one secondary treatment chemical used when treating wastewater 104 are optimized to target, for example, the inorganic constituents with the larger (or, e.g., the largest) wt %, which may facilitate successful removal of the contaminants from the wastewater 104. Once the resultant Medium to High Solids Content Sludge 132 is generated, it may contain up to about 50 wt % aluminum.

The embodiments described herein provide a process for wastewater treatment and sludge disposal which may divert wastewater sludge from landfills to cement kilns for manufacturing cement products. The disclosed processes are a sustainable, efficient, and environmentally sound method for handling wastewater Medium to High Solids Content Sludge, e.g., sold sludge 132. The disclosed method may provide cement kilns, e.g., cement kiln 150, with alternative raw materials for manufacturing cement, eliminating the need for disposal of wastewater sludge and reducing the amount of raw material needed for cement manufacture. Using at least one of the wastewater treatment system 100 and the method for producing sludge 200 for cement manufacturing, the resultant Medium to High Solids Content Sludge 132 may be suitable for cement manufacturing. By matching the abundance of one or more inorganic components within a wastewater stream to the requirements of a cement product, it is possible to minimize the amount of wastewater treatment chemicals and/or pH adjustment chemicals used to treat the wastewater stream and to provide the cement manufacturing process with the highest value raw sludge material.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method for producing sludge, comprising:
   combining wastewater and at least one primary treatment chemical to form a liquid phase and a solid phase, wherein the liquid phase comprises clean water and the solid phase comprises a sludge byproduct;
   separating the liquid phase from the solid phase;
   combining the solid phase with at least one secondary treatment chemical to form an intermediate, the intermediate comprising excess water; and
   removing the excess water from the intermediate to form a treated sludge in a filter press, a vacuum drum, a belt press, a fan press, a band filter, a dewatering box centrifuge, a screw press, a batch tank reactor, an auto sequential batch unit, a continuous flow unit, a dissolved air flotation (DAF) unit, an induced air floatation (IAF) round, a rectangle gravity clarifier, a thickener, and/or an angle plate lamella clarifier.

2. The method of claim 1, further comprising heating the treated sludge in a cement kiln to produce clinker.

3. The method of claim 1, wherein the at least one primary treatment chemical comprises one or more of: bentonite clay, polymer, silica, calcium hydroxide, aluminum coagulant, ferric sulfate, and iron coagulant.

4. The method of claim 1, wherein the at least one secondary treatment chemical comprises one or more of: bentonite clay, calcium hydroxide, and silica.

5. The method of claim 1, wherein the separating occurs in a filter press, a vacuum drum, a belt press, a fan press, a band filter, a dewatering box centrifuge, a screw press, a batch tank reactor, an auto sequential batch unit, a continuous flow unit, a dissolved air flotation (DAF) unit, an induced air floatation (IAF) round, a rectangle gravity clarifier, a thickener, and/or an angle plate lamella clarifier.

6. The method of claim 1, wherein the separating occurs in a filter press, a vacuum drum, or a band filter.

7. The method of claim 1, wherein the at least one secondary treatment chemical comprises bentonite clay or calcium hydroxide.

8. The method of claim 1, wherein the removing occurs in a filter press, a vacuum drum, or a band filter.

9. The method of claim 1, wherein the at least one primary treatment chemical consists of bentonite clay, polymer, calcium hydroxide, aluminum coagulant, ferric sulfate, iron coagulant, or a combination thereof.

10. The method of claim 1, wherein the removing occurs in a band filter or a vacuum drum.

11. The method of claim 10, wherein the at least one secondary treatment chemical comprises bentonite clay.

12. The method of claim 1, wherein the wastewater is derived from a flexographic ink wastewater stream or a generator wastewater stream.

13. The method of claim 1, wherein the at least one secondary treatment chemical consists of a clay or silica.

14. The method of claim 1, wherein the removing occurs in a vacuum drum, a belt press, a fan press, a band filter, a dewatering box centrifuge, a screw press, a batch tank reactor, an auto sequential batch unit, a continuous flow unit, a dissolved air flotation (DAF) unit, an induced air floatation (IAF) round, a rectangle gravity clarifier, a thickener, or an angle plate lamella clarifier, and wherein the separating occurs in a vacuum drum, a belt press, a fan press, a band filter, a dewatering box centrifuge, a screw press, a batch tank reactor, an auto sequential batch unit, a continuous flow unit, a dissolved air flotation (DAF) unit, an induced air floatation (IAF) round, a rectangle gravity clarifier, a thickener, or an angle plate lamella clarifier.

15. The method of claim 1, wherein the at least one primary treatment chemical comprises an aluminum coagulant.

* * * * *